March 31, 1970     C. VAN DER LELY     3,503,190
HARVESTING MACHINES

Filed Nov. 17, 1965     6 Sheets-Sheet 1

INVENTOR
CORNELIS VAN DER LELY
BY
Mason, Mason & Albright
Attorneys

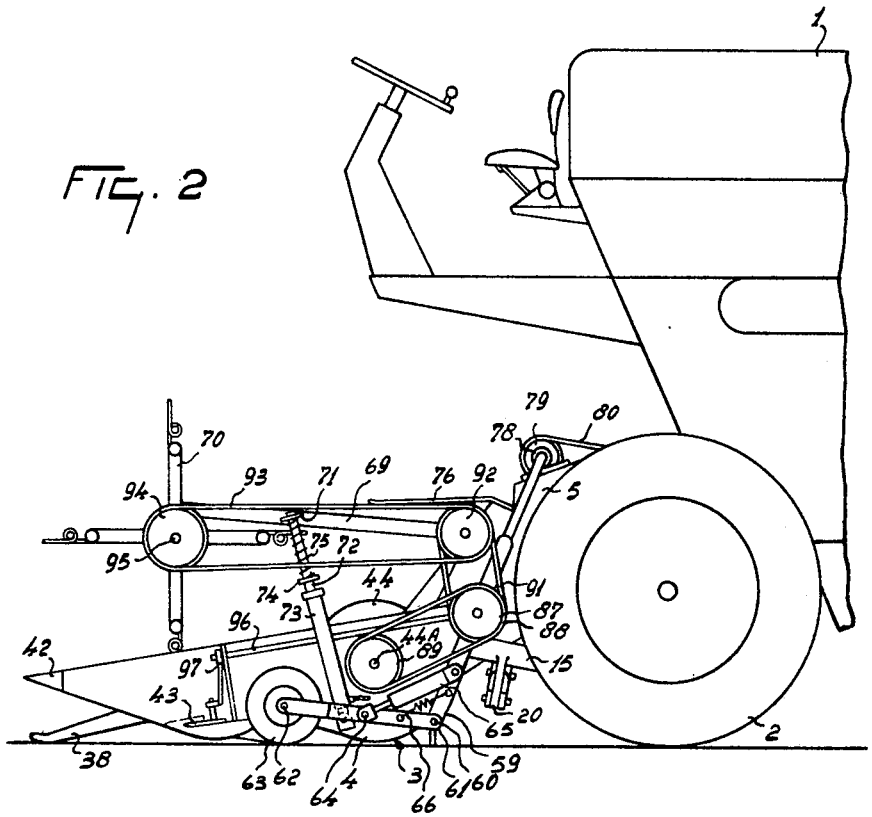

March 31, 1970
C. VAN DER LELY
3,503,190
HARVESTING MACHINES
Filed Nov. 17, 1965
6 Sheets-Sheet 3
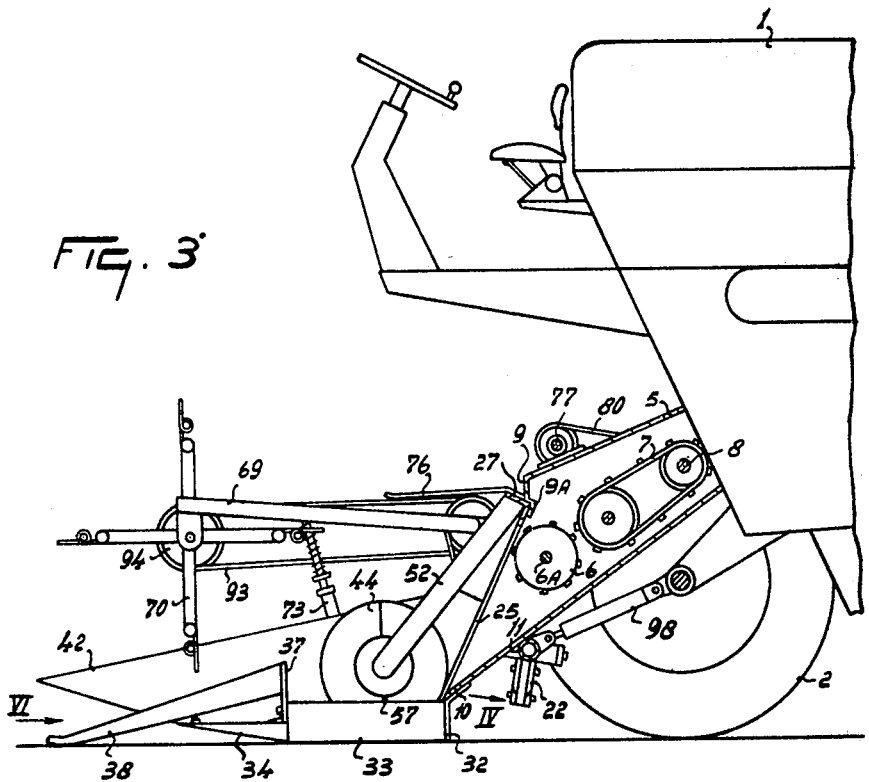
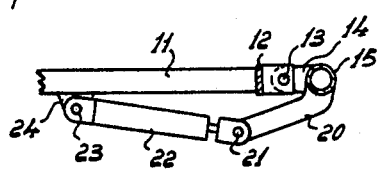
INVENTOR
CORNELIS VAN DER LELY
BY
Mason, Mason & Albright
Attorneys

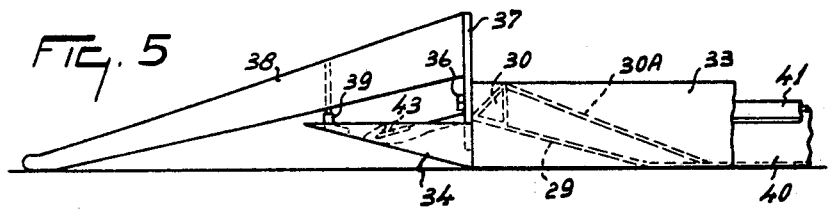
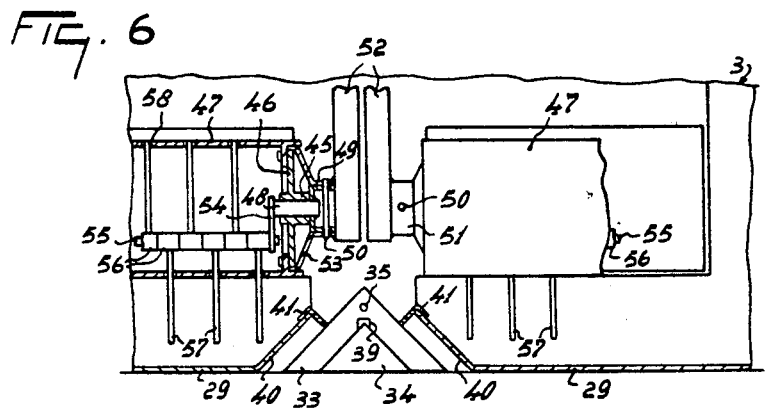
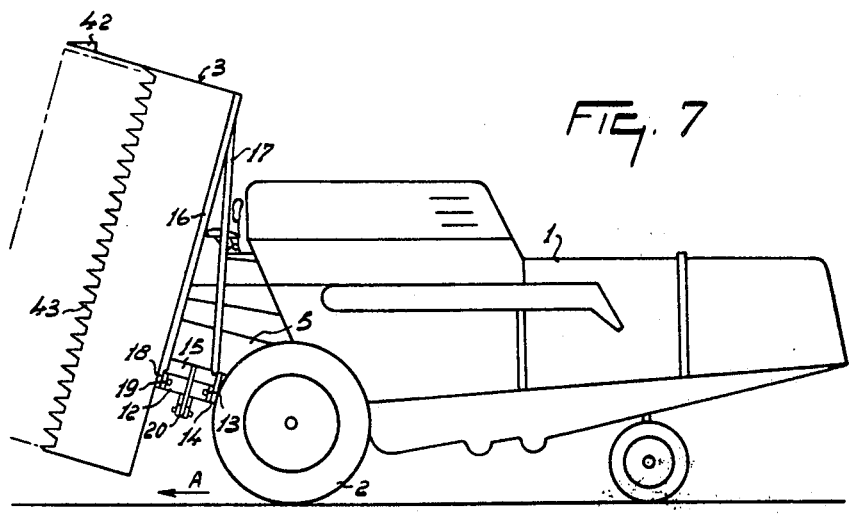

INVENTOR
CORNELIS VAN DER LELY
BY
Mason, Mason & Albright
Attorneys

United States Patent Office 3,503,190
Patented Mar. 31, 1970

3,503,190
HARVESTING MACHINES
Cornelis van der Lely, 7 Bruschenrain, Zug, Switzerland
Filed Nov. 17, 1965, Ser. No. 517,199
Claims priority, application Netherlands, Nov. 27, 1964, 6413779; Oct. 27, 1965, 6513871
Int. Cl. A01d 43/00, 47/00
U.S. Cl. 56—23                                              14 Claims

ABSTRACT OF THE DISCLOSURE

A harvesting machine having two adjacent crop receiving portions disposed side by side and adapted to fold together about spaced apart axes which are directed substantially in the direction of travel of the implement, an elongated element mounted on the frame of the machine located between the crop receiving portions so that they bear against it when in position to receive crop, the crop receiving portions thus presenting an uninterrupted passage for receipt of crop therein; the crop receiving portions each including a mower, a reel and an auger for moving the cut crop, tines being mounted eccentrically in portions of the augers located centrally relative to the machine. Optionally, the elongated element may be provided with a forwardly extending crop divider or rotary mower.

SUMMARY OF THE INVENTION

This invention relates to harvesting machines, such as combine harvesters, of the kind comprising a cutting or pick-up mechanism.

In accordance with the invention there is provided a harvesting machine of the kind set forth, wherein said mechanism comprises at least two adjacent portions which are pivotable relative to the frame of the machine, and wherein the lower sides of the portions have shaped end parts which are adjacent in the working position of the portions, said parts defining passages for crop to be fed into the machine at the junction between the portions.

For a better understanding of the invention and to show how the same may be readily carried into effect, reference will now be made, by way of example, to the accompanying drawings in which:

BRIEF DESCRIPTION OF THE DRAWINGS

FIG. 2 is a side view taken in the direction of the arrow II in FIG. 1, FIG. 3 is a sectional view taken on the line III—III in FIG. 1, FIG. 4 is a fragmentary view, to an enlarged scale, taken, in the direction of the arrow IV in FIG. 3, FIG. 5 is a fragmentary view to an enlarged scale, showing a crop guide in more detail, FIG. 6 is a view, to an enlarged scale, taken in the direction of the arrow VI in FIG. 3, but with a part removed for the sake of clarity, and FIG. 7 is a diagrammatic side view showing the general form of the combine harvester with the mowing platform in a suitable transport position.

DESCRIPTION OF THE PREFERRED EMBODIMENT

Figure 1:
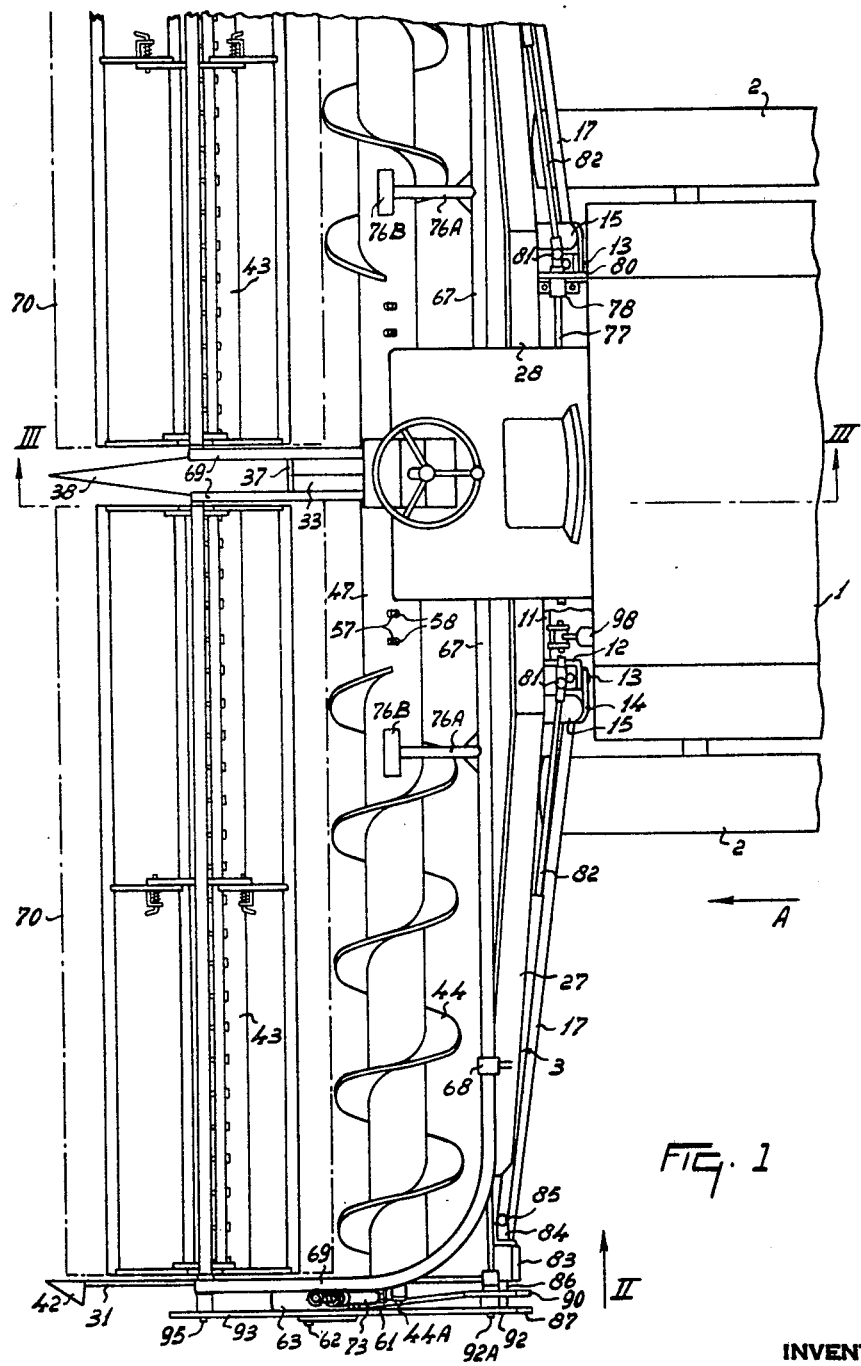
FIG. 1 is a plan view of the foremost part of a harvesting machine in the form of a combine harvester in accordance with the invention.
Figure 8:
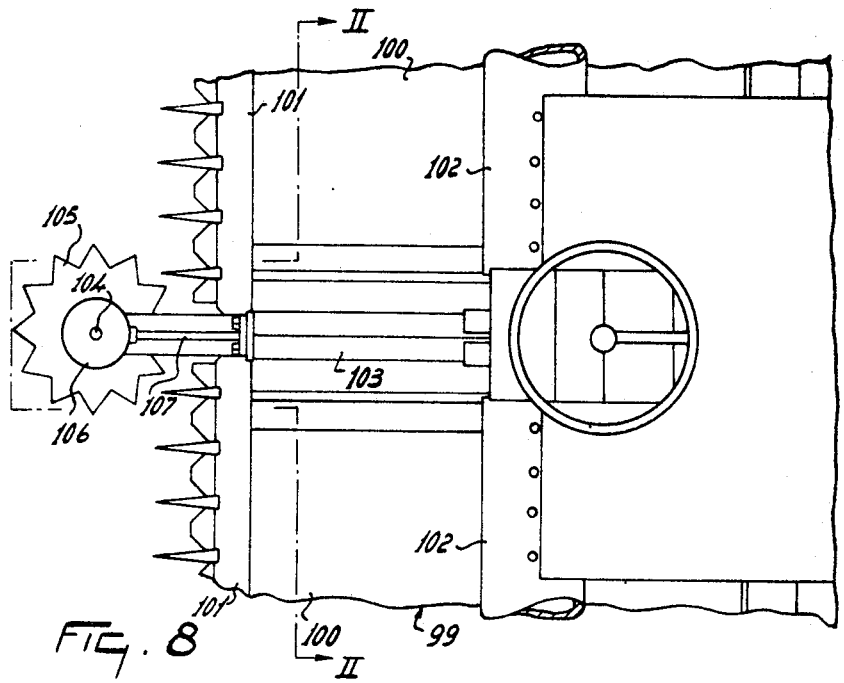
FIG. 8 is a diagrammatical plan view of part of the mowing table of a further embodiment of a harvesting machine according to the invention.
Figure 9:
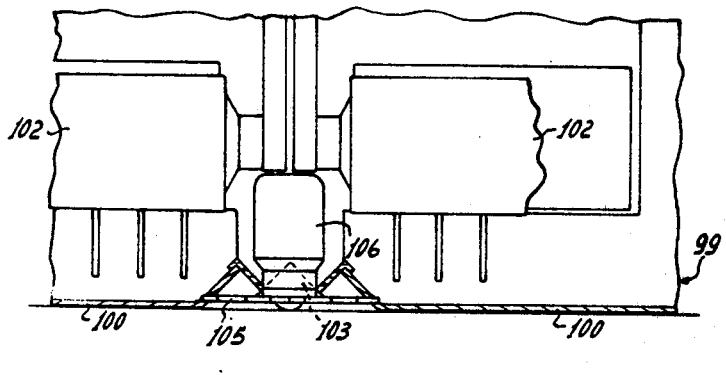
FIG. 9 is an elevation taken on the line IX—IX in FIG. 8.

Referring now to the drawings, the harvesting machine comprises a combine harvester which has the cutting and gathering mechanism arranged at the front of the ground wheel supported frame. The frame 1 is supported, at the front, by ground wheels 2 and a mowing table or platform 3 is arranged on said frame. The mowing table 3 comprises two adjacent portions 4 which adjoin each other in their working positions and are pivoted to the frame 1 in a manner more fully described later. An elevator housing 5 is arranged on the frame 1 and extends rearwardly of the mowing table 3. During operation of the combine harvester when the mowing table 3 is arranged to cut and gather crop, the housing 5 extends upwardly from the table 3 and defines a central opening for crop gathered by the cutting and gathering mechanism, which crop is urged upwardly through the housing 5.

A rotatable cylinder 6 is mounted on a shaft 6A which is received in the side walls of the housing 5 near the front end thereof which adjoins the mowing table 3. An endless conveyor 7 is arranged within the housing 5 and is rotatable about a shaft 8 which is journalled in the side walls of the housing 5 near the upper end thereof. In addition, the shaft 8 affords a pivotal axis, extending perpendicular to the intended direction of operative travel of the combine harvester, about which the mowing platform 3 and housing 5 are upwardly and downwardly turnable (FIG. 3).

From FIG. 3 it will be evident that the upper surface of the housing 5 merges into a downward portion 9 at its forward end, the portion 9 merging into an angular portion 9A which is arranged to mate with the upper edge of the table 3. The lower surface of the housing 5 merges into a bent over portion 10 at its forward end, said portion 10 being in alignment with the portion 9A.

A circular frame beam 11 is arranged on the underside of the lower surface of the housing 5 and extends perpendicular to the intended direction of travel. The frame beam 11 extends up to the upright sides of the housing 5 and lies in a plane perpendicular to the plane containing the portions 9A and 10 of the housing and which is inclined to the horizontal at an angle of less than 90°. The ends of the frame beam 11 carry strips 12 which extend partly in the intended direction of travel but have their ends bent over outwardly from the housing 5 (FIGS. 1 and 7). The bent over end of each strip 12 remote from the mowing table 3 carries a pivot 13 on which a corresponding lug 14 is mounted that extends transversely of the intended direction of travel. Each lug 14 is secured to a corresponding circular beam 15 which extends parallel to the corresponding strip 12 when viewed from above. The beam 15 also lies in a plane extending substantially perpendicular to the plane passing through the bent over portions 9A and 10 of the housing 5 (FIG. 3). The end of each beam 15 remote from the corresponding lug 14 is secured to a channel beam 16 (FIG. 7) which extends perpendicular to the intended direction of travel when the mowing table 3 is in an operative position and is secured to the rear wall of the corresponding mowing table portion 4. Each beam 16 extends from its connection with its corresponding beam 15 to the outer edge of the corresponding mowing portion 4. Also a frame beam 17 (FIG. 7) is arranged between the outer end of the beam 16 and the end of the corresponding beam 15 remote from the mowing table.

It will be evident from FIG. 7 that each beam 16 is extended beyond the corresponding beam 15 by a portion 18 which carries a pin 19 that is rotatably received within the forward bent over end of the strip 12. The center lines of the pins 19 and 13 coincide.

Each beam 15 carries a depending curved arm 20 (FIGS. 3 and 4), each arm 20 being rigidly secured to the center of the corresponding beam 15 and being pivotally connected at its other end with a hydraulic ram 22 by means of a pivot 21. Each ram 22 is pivotally connected to the corresponding beam 11 by means of a lug 24 which is secured to the beam 11 and a pin 23. As will be seen in FIG. 7, each beam 16 is secured to the rear surface of the corresponding mowing table portion 4.

The rear surface or wall 25 of each mowing table portion 4 comprises a plate and part of the rear wall which is located directly in front of the elevator housing 5 lies in a plane that is parallel to the plane passing through the bent over portions 9A and 10. However, the rear wall 25 of each portion 4 extends slightly forwardly, with respect to the intended direction of operative travel, from the connection point of the beam 15 to the beam 16 and the rear wall 25 also decreases in height towards the outer edge of the corresponding portion 4 (FIGS. 1, 2 and 3).

The upper edge of a rear wall 25 is afforded by an angle beam 27 which describes the above mentioned course of the wall while a portion 28, that is located in front of the housing 5, and bears against the bent over end 9A extends substantially horizontally. The rear wall 25 of each portion merges into a substantially horizontal forwardly extending portion 29 which comprises the lower side or base of the portion 4. The front side of each portion 29 is secured to a beam 30 which extends transversely of the intended direction of travel. A cover plate 30A is arranged between the upper side of the beam 30 and the portion 29 (FIG. 5). Each beam 30 is disposed on the outer side of the corresponding portion 4 of the mowing table on a vertical side wall 31 which extends between the rear wall 25 and the portion or base 29 (FIG. 1).

As will be seen in FIG. 3, the bent over end 10 of the housing 5 is provided with a support 32 which carries a box-shaped element 33 that extends in the intended direction of operative travel. It will be seen in FIG. 6 that the element 33 is of elongated shape and triangular cross section, the element extending through a length substantially equal to the length of the lower portions 29 of the mowing table. The element 33 is so arranged that its cross section reduced continuously at its forward end and comprises a smaller portion or point 34. A recess 35 is formed in a portion of the element 33 located rearwardly of the portion 34, the recess 35 being formed with a screw thread for receiving a bolt 36 by means of which a strip 37 can be fastened to the element 33. The strip 37 is connected to a tapering elongated portion 38 whose length is at least twice the length of the portion 34 which merges into a point as will be seen in FIG. 5. The upper side of the portion 38 is rounded off and the portion 38 is also provided with a recess which is arranged to co-operate with a hook 39 which is carried by the portion or point 34 of the element 33 for connecting the portion 38 to the element 33. From FIG. 6 it will be evident that the lower portions 29 merge into portions 40 which are bent upwardly near the element 33, the portions 40 extending towards the upper edge of the element 33 and parallel to the side walls thereof. The portions 40 are provided with sealing means in the form of strips 41 which are made of elastic material, such as rubber, which close the gaps between the portions 40 and the element 33. Each side wall 31 of the corresponding portions 4 carries a crop divider 42 and each beam 30 is secured to a cutter bar 43 comprising part of the cutting mechanism.

A feed auger 44 is mounted behind each cutter bar 43 in a bearing 45 (FIG. 6) which is received within a plate 46. Each auger 44 comprises a sleve 47 which encloses the corresponding plate 46 and each bearing 45 receives a corresponding shaft 48, which shaft 48 is also received within a sleeve 49 that is received within a larger sleeve 51 and is fixed thereto by means of a pin 50. The sleeve 51 is secured to the lower end of a beam 52 (FIGS. 3 and 6) which is secured, at its upper end, to the beam 27. Each sleeve 51 opens out into a conical portion 53 which bears against the plate 46 within the sleve 47. In this way a satisfactory seal is obtained.

Each shaft 48 carries a depending arm 54 at one end, which arm 54 carries a shaft 55 that extends parallel to the shaft 48. Prongs or tines 57 are carried by the shaft 55 on sleeve bearings 56. The prongs 57 are taken through openings 58 formed in the sleeve 47 of the auger 44. It will be evident that the prongs 57 are eccentrically mounted with respect to the shaft 48 and, accordingly, during rotation of the auger the prongs 57 will move inwardly and outwardly relative to the auger through the openings 58. In fact, the prongs 57 are located in their outermost positions relative to the shaft 48 when in their lowermost positions and are located nearest to the shaft 48 when in their uppermost positions. It will be evident from FIG. 1 that the prongs 57 are provided on the augers 44 only over a distance substantially in front of the elevator housing 5. The outer ends of the augers 44 are supported by shafts 44A (FIG. 1), which are mounted in the side walls 31. It will be evident from FIG. 6 that there are no upright side walls between the adjacent ends of the mowing table portions 4 so that crop can be readily cut and gathered throughout the entire width of the mowing table 3. Also the junction of the portions 40 of the base of the mowing table portions 4 with the element 33 ensures an uninterrupted guide for crop near the junction between the two adjacent portions 4.

Referring to FIG. 2 it will be evident that both portions 4 of the mowing table and associated mechanisms are identical and accordingly only one will be described. It will be seen that a depending strip 59 is provided for the portion 4 of the mowing table 3, the strip 59 being secured to the rear wall 25. The lower end of the strip 59 carries a pin 60 by means of which an arm 61 is pivotally connected to the strip 59. The arm 61 extends in the intended direction of operative travel and carries, at its free end, a ground wheel 63 that is mounted on an axle 62 which is carried by the arm 61. The arm 61 is pivotally connected, near its center, to one end of a hydraulic ram 65 by means of a pin 64, the other end of the ram 65 being pivotally connected to the strip 59. A spring 66 is provided which extends between the strip 59 and arm 61.

A horizontal beam 67 (FIG. 1) is secured above the rear wall 25 of the portion 4 and extends perpendicular to the intended direction of operative travel. The beam 67 is pivotally supported in a bearing 68 carried by the upper side of the angle beam 27 and is also pivotally supported by means of a pin (not shown) which affords the connection between a lug carried by the angle beam 27 at the level of the housing 5 and a lug carried by the beam 67. The beam 67 merges into forwardly direction portions 69 which extend in the intended direction of travel and rotatably receive the ends of a shaft 95 on which a reel 70 is mounted. The beam 67 and portions 69 comprise a reel support. The outer portion 69 carries a lug 71 and a corresponding rod 72 is taken through a suitable hole formed therein (FIG. 2). The rod 72 forms part of a hydraulic ram 73 which is pivotally connected to the side wall 31 of the portion 4. A compression spring 75 is arranged around the rod 72 between the lug 71 and a stop 74 mounted on the rod 72. An angular strip 76 (FIG. 2) is provided on the upper side of the elevator housing 5 and acts as a stop for limiting upward movement of the reel support 67. The strip 76 is arranged to engage a plate 76B which is carried by the beam 67 through a support 76A (FIG. 1).

The cutter bars 43, the augers 44 and the reel 70 are arranged to be driven in both the mowing table portions 4 by means of a driving shaft 77 that is arranged on the upper side of the elevator housing 5. The shaft 77 is journalled in bearings 78 and extends perpendicular to the intended direction of operative travel, the bearing 78 being arranged near each of the side walls of the housing 5 (FIGS. 1 and 2). The shaft 77 carries a sprocket 79 on one end, said sprocket 79 being linked to a driving shaft which is coupled with the engine through a chain 80. The shaft 77 also carries universal joints 81 at each end and telescopic shafts 82 are coupled with said joints 81. The universal joints 81 are located, as will be seen in FIG. 1, just above the pivotal axes of the mowing table portions 4 which are afforded by the pins 13 and 19. The telescopic shafts 82 are coupled with gear boxes 83 which are arranged near the outer sides of the mowing table oprtions. The shafts 82 are coupled with the gear boxes 83 through stub shafts 84 and universal joints 85. Stub shafts 86 project outwardly from the gear boxes 83 and carry sprockets 87 which are linked with sprockets 89 on the rotary shafts 44A of the augers 44 by way of chains 88. The shafts 86 also carry sprockets 90 (FIG. 1) which are linked to sprockets 92 by way of chains 91, the sprockets 92 being rotatable on shafts 92A which are mounted on the beam 67. The sprockets 92 are linked to sprockets 94 (FIG. 2) by means of chains 93, the sprockets 94 being mounted on driving shafts 95 of the reels 70. Shafts 96 project forwardly from the gear boxes 83 along the side walls 31 and are coupled with the knives of the cutter bars 43 through eccentrics 97 (FIG. 2).

It will be evident from FIGS. 1 and 3 that hydraulic rams 98 are arranged between the axle of the ground wheels 2 and the frame beam 11 that supports the elevator housing 5. The hydraulic rams serve for raising and lowering the elevator housing 5 together with the mowing table 3.

The combine harvester moves in the direction of the arrow A during operation and the two portions 4 of the table 3 bear against the ground surface through the ground wheels 63 and the height of the mowing table relative to the ground can be adjusted by means of the hydraulic rams 65 which raise or lower the wheels 63 relative to the table 3. It will be evident from FIGS. 1 and 3 that the driver's seat is located substantially above the mowing table 3 so that a satisfactory view is obtained by the driver of the cutting and gathering operation by the combine harvester.

As mentioned previously, the portions 4 of the mowing table 3 are not provided with adjacent vertical side walls but engage with the element 33 and are sealed thereto by means of the strips 41. The element 33 is secured to the lower side of the elevator housing 5. It is thus possible to cut crop and to feed same to the housing 5 throughout the width of the platform 3. The junction between the adjacent ends of the mowing table portions afforded by the element 33 comprises an uninterrupted guide for crop. Also the adjacent ends of the augers 44 are carried by the depending beams 52 rather than being mounted in adjacent side walls so that this also does not hinder the gathering of crop near the junction between the two augers. The elongated portion 38 which is carried by the point 34 of the element 33 obtains a satisfactory division of crop before being cut. However, the portion 38 is readily removable by loosening the bolt 36. This might be done, for example, when the combine harvester is used to gather crop, which has already been cut and is lying in swaths, by means of the pick-up or gathering mechanism. For subsequent mowing operations the tapering portion 38, can, of course, be refastend. The reels 70 are resiliently pivotable with respect to the platform portions by virtue of the provision of the compression springs 75 which are associated with the hydraulic rams 73.

When it is desired to move the working parts of the combine harvester into a suitable transport position, it is desirable that the mowing table 3 and elevator housing 5 be lifted up over a given distance by operating the hydraulic rams 98. Thereafter, the hydraulic rams 22 may be operated to turn both portions 4 of the mowing table 3 upwardly about the pins 13 and 19 into the position shown in FIG. 7, the pins extending in a plane parallel to the direction A and at an angle to the horizontal. The angular strips 76 serve to limit the upward turning of the portions 4 by coming into contact with the plates 76B that are carried by the beams 67. Also the reels 70 are urged towards the mowing platform 3 by the indirect engagement of the strips 76 with the beams 67 which carry the reels 70. This movement of the reels 70 is resiliently opposed by the compression springs 75 which are associated with the hydraulic rams 73. With this arrangement, the view of the road ahead by the driver is reduced as little as possible. The reels may also be moved towards the platform 3 by operating the hydraulic rams 73 so as to draw the reels 70 towards the table 3. Also, of course, it will be evident that the drive from the shaft 77 to the augers 44 and cutter bars 43 will not hinder the upward turning of the portions 4 by virtue of the provisions of the universal joints.

The hydraulic rams described herein are of course, coupled with a suitable hydraulic circuit of the combine harvester and are operated by control valves which allow liquid to flow to or from the rams from or to a pump or a reservoir respectively.

FIGS. 8–11 show part of the mowing table 99, associated with the cutting mechanism of a harvester thresher. The mowing table 99 comprises two portions 100, each adapted to pivot relatively to each other around a pivotal axis extending in the intended direction of travel. Each of the portions 100 is provided with its individual cutting mechanism comprising a cutter bar 101, behind which an auger 102, extending transversely of the intended direction of travel, is arranged. Between the two portions 100 the frame of the machine is provided with a part 103, extending in the intended direction of travel and having a triangular section (see FIG. 9), one side of which is parallel to the ground. The adjacent sides of the portions 100 of the mowing table join the side walls of the part 103. The part 103 extends in front beyond the cutting mechanism of the portions and is provided at the front with a substantially vertical shaft 104, on which a disc 105, provided at its periphery with projections, is arranged so as to form a rotatable knife. The shaft 104 is arranged by means of a support 107 on the part 103. In the embodiment shown in FIGS. 8 and 9 the rotary shaft 104 of the knife 105 is provided with a hydraulic motor 106, located above the knife and communicating through ducts in support 107 with the hydraulic system of the machine.

Figure 10:
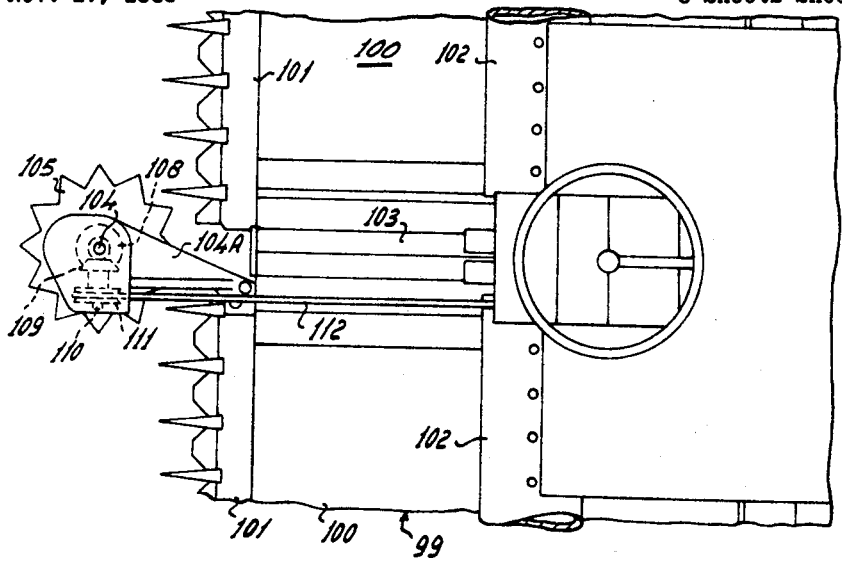
FIG. 10 shows a second embodiment of a driving mechanisms for the rotatable knife.

The embodiment shown in FIG. 10 shows a construction in which a bevel gear wheel 108 is provided on the rotary shaft 104 above the knife 105, which wheel is adapted to co-operate with a bevel gear wheel 109 on a shaft 110, provided on the other side with a disc 111, around which a belt 112 is wound. The belt 112 is taken around a disc (not shown) on the rotary shaft of one of the augers 102 associated with said portions and arranged behind the cutting mechanism.

Figure 11:
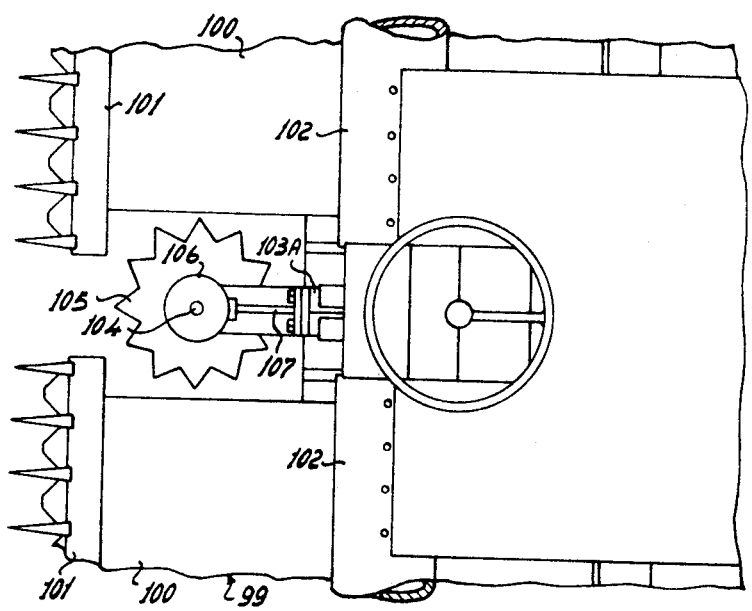
FIG. 11 shows a further embodiment of an arrangement for the rotatable knife.

With the embodiment shown in FIG. 11 the rotary knife 105 is located between the portions 100 and supported by a part 103A.

The construction described above operates as follows:

In operation, the machine is propelled in the direction of the arrow A. Hereby the two portions 100 of the mowing table 99 can match the unevennesses of the ground by their pivotal movement about the pivotal shaft, whereas the crop is mown by the cutter bars 101 associated with each of the portions. The strip of crop located between the two portions is cut by the rapidly rotating knife 105 on the part 103, 103A respectively, serving as a support between the portions 100 and like the crop cut by the cutter bars it is conveyed into the machine.

By means of the construction described above the crop can be cut throughout the width of the mowing platform. Instead of a rotating knife a reciprocating knife, e.g., cutter bar can be used.

Having thus described my invention, what I claim as new and desire to secure by Letters Patent of the United States is:

1. A combine harvester including a frame and a mowing table supported on said frame, said mowing table comprising two portions, said portions being pivotally mounted on spaced apart pivot means provided on said frame, the pivot axis of said pivot means extending substantially in the operative direction of travel of said harvester, said portions being foldable about said pivot means from operative harvesting position to transport position, said portions being positoned adjacent one another in working operation and said portions having shaped end parts positioned side-by-side in working operation to define passage means for receiving crop between said portions, said harvester having a joining means, including an elongated element, which cooperates with said shaped end parts to define a guide to guide the crop into said harvester at the junction between said portions.

2. The machine of claim 1, wherein said elongated element has a tapering part projecting forwardly in the direction of travel.

3. The machine of claim 2, wherein said tapering part is releasably connected to said elongated element.

4. The machine of claim 1, wherein said elongated element is located substantially centrally of the machine.

5. The machine of claim 1, wherein said elongated element has an elongated box-like configuration and extends over a distance approximately equal to the width of said mowing table.

6. The machine of claim 5, wherein said elongated element is triangular in configuration and said shaped end parts are bent upwardly and connected to the sloping sides of said element.

7. The machine of claim 6, wherein said shaped end parts extend upwardly to adjoin said element near its upper edge thereof.

8. The machine of claim 1, wherein each of said portions includes an auger and support means for mounting the augers side-by-side, said support means being connected to the upper sides of said portions whereby a crop passage is defined between said augers and the bottoms of said portions.

9. The machine of claim 1, wherein each of said portions includes a resilient part that bears against said elongated element in operative harvesting position.

10. The machine of claim 1, wherein a crop divider is mounted on said elongated element to extend forwardly.

11. A combine harvester having a frame and a mowing table mounted on said frame, said mowing table comprising two portions which are pivotally mounted on spaced apart pivot means provided on said frame, the pivot axis of said pivot means extending substantially in the operative direction of travel of said harvester, said portions positioned side-by-side to define passage means between them for receiving mown crop, said portions being foldable about said pivot means from their operative harvesting position to a transport position, an elongated element mounted on said frame to extend forwardly between said portions to define part of said passage means, each of said portions having a resilient part which bears against said element when said portions are in their operative harvesting position.

12. The machine of claim 11, wherein a crop divider is mounted on said elongated element, said crop divider extending forwardly.

13. The machine of claim 11, wherein mowing means is mounted adjacent said mowing table, said mowing means extending forwardly of said elongated element.

14. The machine of claim 13, where said mowing means comprises a rotary mower positioned between said portions.

References Cited

UNITED STATES PATENTS

| | | | |
|---|---|---|---|
| 3,066,465 | 12/1962 | Fischer | 56—25 |
| 1,724,300 | 8/1929 | Moncreiffe | 56—21 |
| 2,224,970 | 12/1940 | Lindgren et al. | 56—20 |
| 2,262,906 | 11/1941 | Raney et al. | 56—122 |

FOREIGN PATENTS 8,339  9/1955  Germany.

HUGH R. CHAMBLEE, Primary Examiner

U.S. Cl. X.R.

56—134